(12) United States Patent
Mah

(10) Patent No.: US 7,439,633 B2
(45) Date of Patent: Oct. 21, 2008

(54) POWER SUPPLY

(75) Inventor: Pat Y. Mah, Kowloon (HK)

(73) Assignee: Daka Research Inc. (Br. Virg. Isl Corp.) Offshore Incorporations Centre, Tortolla (VG)

( * ) Notice: Subject to any disclaimer, the term of this patent is extended or adjusted under 35 U.S.C. 154(b) by 578 days.

(21) Appl. No.: 11/131,786

(22) Filed: May 17, 2005

(65) Prior Publication Data

US 2006/0262463 A1 Nov. 23, 2006

(51) Int. Cl.
*H02J 3/00* (2006.01)
(52) U.S. Cl. ....................................................... 307/26
(58) Field of Classification Search ............. 363/16–26, 363/78, 95, 97, 98; 307/26
See application file for complete search history.

(56) References Cited

U.S. PATENT DOCUMENTS 5,297,014 A * 3/1994 Saito et al. ............... 363/21.17
6,233,165 B1 * 5/2001 Irissou et al. ................. 363/97
2006/0239044 A1 * 10/2006 Chen et al. ..................... 363/41

* cited by examiner

*Primary Examiner*—Shawn Riley
(74) *Attorney, Agent, or Firm*—Curtis L. Harrington; Kathy E. Harrington; Harrington & Harrington

(57) ABSTRACT

A switching mode power supply uses two power source inputs, an alternating current input and a direct current input. A pulse width modulation controller is used to control current from two primary windings of a transformer. The secondary of the transformer has a rectified direct current output. From the direct current output a current/voltage comparator receives a signal across a sensing resistor and through an inverter and in parallel with respect to the direct current output. The current/voltage comparator may communicate through an opto coupler/isolator and then to a pulse width modulation controller. Instructions are received about the voltage and current necessary to be supplied by the direct current output of the power supply from an internal, circuit board mounted selecting network. The selecting network can be resistive, digital, fiber optical, black and white, or color.

5 Claims, 2 Drawing Sheets

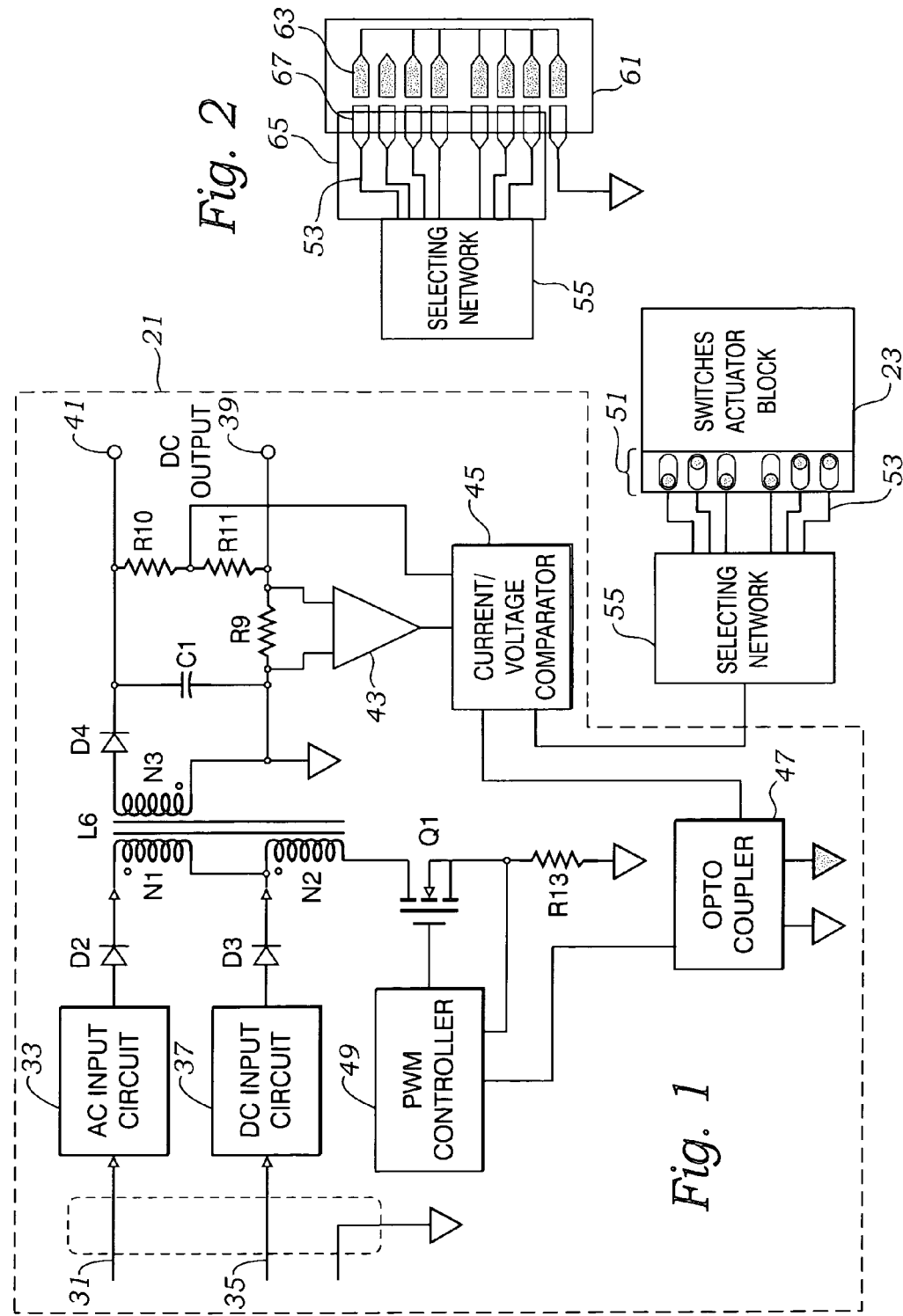

POWER SUPPLY

FIELD OF THE INVENTION

The present invention relates to the field of power supplying devices, and more particularly to a discretely switchable variable power supply for enabling conversion of alternating current mains to at least one of a pre-specified voltage characteristic for use with a proper appliance receiver of such power.

BACKGROUND OF THE INVENTION

Voltage and current controllable electrical power supplies are known. Some of the most expensive and user controllable power supplies have sensitive precise scientific adjustment capabilities. Smaller power supplies are available for inexpensive personal electronics as a battery replacement. However these generic battery replacements have the ability to output discrete voltage based upon a selector switch. The selector switch typically has discrete voltage selection in multiples of battery cell values, such as 3 volts, 4.5 volts, 6 volts, 9 volts and 12 volts. Such user adjustable supplies can damage equipment if the selector switch is improperly set, either too high or too low. The one saving grace of small battery replacement supplies is the low current capability. An improper setting will cause damage typically limited by the low current capability of the device.

Personal computers, however, have a much higher current demand. Most personal computer and lap top power supplies are specialized with specific voltage and current requirements. It is especially because the power capability is higher, that the results of placing a choice of voltage and current capability in the user's hands can cause such significant damage. Further, the destruction and damage would be expensive as the destruction of components of personal computers and laptops are much more costly than the destruction of most personal electronic equipment.

An earlier power converter for personal electronics equipment was seen in U.S. Pat. No. 5,347,211, incorporated by reference herein. In the scheme set forth in this reference, users were provided with a key which had an electrical component which was sensed by the main control circuitry. The voltage output was proportional to the value of a resistor in an insertable structure. Since the output of the power supply was proportional to the value of resistance, the isolation of control could be circumvented by providing an insertion structure with a variable resistance, isolation could easily be circumvented.

Given the value and importance of personal computers and lap tops, what is needed is a system by which control of the voltage and current output of a power supply may be effectively isolated. The mechanism of isolation should not be amenable to easy circumvention.

SUMMARY OF THE INVENTION

A switching mode power supply uses two power source inputs, an alternating current input and a direct current input. A pulse width modulation controller is used to control current from two primary windings of a transformer. The secondary of the transformer has a rectified direct current output. From the direct current output a current/voltage comparator receives a signal across a sensing resistor and through an inverter and in parallel with respect to the direct current output. The current/voltage comparator may communicate through an opto coupler/isolator and then to a pulse width modulation controller.

The current/voltage comparator receives its instruction about the voltage and current necessary to be supplied by the direct current output of the power supply from an internal, circuit board mounted resistor selecting network. The resistor selecting network has a number of electrical connection to a switches actuator block. The switches actuator block can have a number of switches which connect certain ones of the number of electrical connections together. The wiring inside the switches actuator block can be connected in a manner that they cannot be seen. The switch settings for certain personal computer and lap top can be given in the form of a code for setting the switches. Since the switches actuator block can be constructed to conceal which of the resistor selecting network wires are being connected, the user supplies a setting which is supplied to correspond to the voltage and current requirements for their personal computer, lap top, or other personal electronic device. For a circuit in which the voltage output is to be completely specified and controlled by the user, the switches actuator block can be wired to correspond to a binary value. In this case, the user can more easily have complete control of the power supply, and a conversion table between the binary settings on a series of dip switches and voltage outputs can be supplied.

As an alternative to providing dip switches and a resistor selecting network for sensing the dip switch settings, a multi conductor structure can be provided in which certain ones of the conductors are connected to multiple other conductors while some conductors are not connected. Further, the resistor sensing network can utilize multiple numbers of internal resistors along with the conductor logic in the conductor structure to supply an ultimate resistance to the current/voltage comparator. In this case, the "code" for the selector can involve conductors whose connection to each other is not known, in combination with an internal "resistor sense" network which will supply a total resistance based upon the network and the connections in the conductor structure. Physically, the conductor structure can be well covered and possibly potted to help prevent a visual discovery of the built in logic. The logic can be discerned by an extended test of the conductors in the conductor structure, but even this can be blunted by physically limiting the exposure of the conductors on the structure.

Other means of transmitting logic can be done fiber optically or optically by color. For fiber optics, a light conductor structure can be provided which selectively promulgates light along certain channels in the light conductor structure. For example light entering at port 1 might show up at ports 3 and 9. Light attempting to enter ports 2 and 3 may be blocked.

The same logic can be implemented with black and white areas on a reflectivity and absorbance structure. The same logic can also be implemented on a color structure, or by having a series of color filters in a light filter structure.

BRIEF DESCRIPTION OF THE DRAWINGS

The invention, its configuration, construction, and operation will be best further described in the following detailed description, taken in conjunction with the accompanying drawings in which:

FIG. 1 is a schematic block diagram of one possible configuration of a power supply system utilizing output feedback measurement, and shown with a switches actuator block control input of a current/voltage comparator;

FIG. 2 is a variation on the input related to the resistor selecting network and illustrating a series of conductors which make selective connection of the resistors in the resistor network.

DETAILED DESCRIPTION OF THE PREFERRED EMBODIMENT

Figure 3:
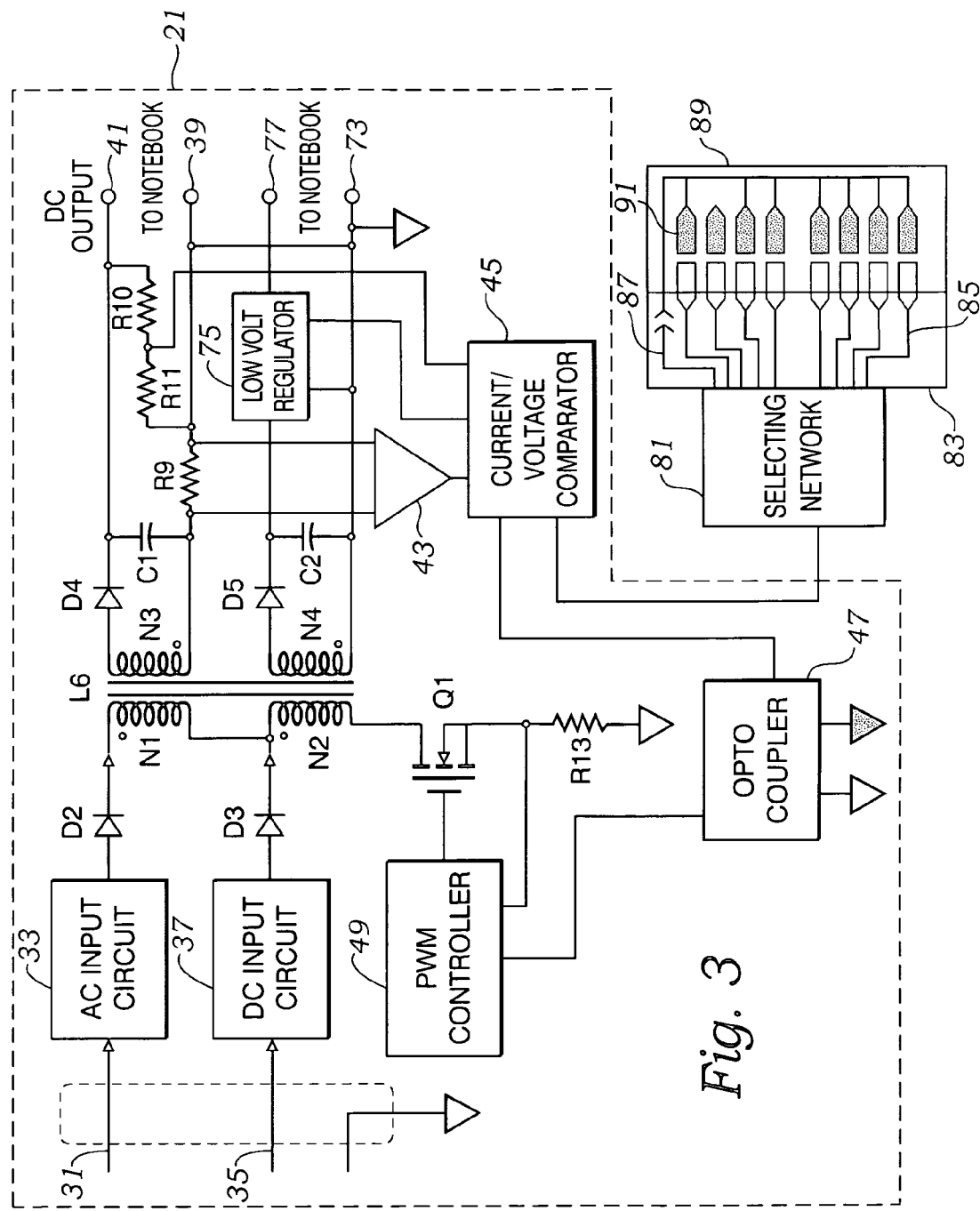
FIG. 3 is a schematic block diagram of another possible configuration of a power supply system utilizing a transformer having a pair of secondary output windings capable of supplying separate power outputs.

The power supply of the present invention can be best described initially by reference to FIG. 1. FIG. 1 is a schematic block diagram of one possible configuration of a power supply system 21 utilizing output feedback measurement, and shown with one possible input device, a switches actuator block 23. Other input devices will be shown.

At the upper left side of FIG. 1, an alternating current input line 31 may derive power from conventional mains, such as 120 volt AC mains in the U.S. & Canada, or 240 volt mains in Europe. An alternating input circuit 33 takes alternating current power from the alternating current input line 31 and performs appropriate reduction, induction, resistance or other treatment as appropriate to make the power available to a diode D2. The output of diode D2 is connected to a first dotted input of a first winding N1 of a transformer L6.

At the upper left side of FIG. 1, and below alternating current input line 31, a direct current input line 35 is seen. Direct current input line 35 may derive power from another smaller power supply from rectification of alternating current input line 31, or it may derive power from a battery or other direct current source. A direct current input circuit 37 takes direct current power from the direct current input line 35 and performs appropriate reduction, induction, resistance or other treatment as appropriate to make the correct level power available to a diode D3. The output of diode D2 is connected to a second dotted input of a second winding N2 of a transformer L6. The output of diode D2 is also connected to the non-dotted end of first winding N1 of transformer L6.

Transformer L6 has a secondary winding N3 having a dotted terminal which is grounded with respect to the output section of the power supply system 21. The dotted terminal of secondary winding N3 is connected through a resistor R9 and to a grounded output terminal 39. The other, non dotted terminal of winding N3 is connected through a diode D4 and becomes a direct current output terminal 41.

The dotted and non-dotted terminals of winding N3 are connected in parallel with a capacitor C1. The output terminals 39 and 41 are connected by a series connected pair of resistors R10 and R11. One end of Resistor R9 is connected to one input of an comparator 43. The other end of resistor R9 is connected to a second input of comparator 43. An output of the comparator 43 is connected into a current/voltage comparator 45.

A control output of the current/voltage comparator 45 is fed into an opto coupler 47 which isolates the secondary winding N3, and its associated circuitry, of transformer L6 from the primary windings N1 and N2 and their associated circuitry.

An output of the opto coupler 47 is fed into a pulse width modulation PWM Controller 49. PWM controller 49 is operably connected to the gate of a MOSFET transistor Q1. The drain of the transistor Q1 is connected to the non dotted lead of winding N2 of transformer L6. The source of transistor Q1 is grounded through a resistor R13. The source of transistor Q1, and its voltage, is made available to PWM controller 49 so that the PWM controller will have some feedback as to the current passing through transistor Q1.

Referring to the lower right of the diagram of FIG. 1, the switches actuator block has a number of conductors, which are represented by only 6 in order to not overburden the drawing. In its physical realization, the switches actuator block may be a series of dip switches 51. The dip switches 51 may be manually actuated to a fixed position, or may be spring loaded and activated by a configuration actuator. One such configuration actuator may be a piece of plastic having a configuration of stepped surfaces so that which pushed over the switches actuator block 23, certain of the individual switches immediately assume a configuration matching the setting of the dip switches 51 necessary to give the desired voltage and current output characteristics.

Regardless of the physical configuration of the switches actuator block, a series of conductors 53 are made available to a selecting network 55. The selecting network interprets which of the conductors 53 put into contact with each other and translates the state of its conductor 53 inputs to a command output which is connected to the current/voltage comparator 45.

Where the selecting network is a resistance network, the numbers and identity of conductors 53 connected together are translated to a voltage which is provided to the current/voltage comparator 45. Where the selecting network is digital, the configuration of the conductors 53 which are connected an not connected are translated to a digital number or signal and made available to the current/voltage comparator 45.

Rather than physical switches, the mating of conductors can be used to accomplish the same type of connectivity. Referring to FIG. 2, an alternative configuration of the structure associated with the selecting network 55 is shown. A connector 61 has a housing with internal contacts 63 and will typically be provided to the user of the power supply system 21. The contacts 63 can be recessed inside the housing and the connectivity of the contacts by which some of the contacts 63 are shown interconnected and others are not can be hidden from view. The user connects the connector 61 into a mating connector 65 having contacts 67 connected to the previously seen conductors 53. Thus the equivalent connectivity as would have been had with the dip switches 51 is now had with the connectivity of selected ones of the contacts 63 which is transmitted to contacts 67 upon connection.

Referring to FIG. 3, a schematic block diagram of another possible configuration of a power supply system utilizing a transformer having a pair of secondary output windings capable of supplying separate power outputs is shown. The other components seen in the circuit of FIG. 1 are labeled as seen in FIG. 1 and a discussion will be had with respect to the components which have changed or which have been added.

At the middle of FIG. 3, an additional winding N4 is added to the transformer L6. Rectified direct current which may be of a lower value than the output current available from terminals 39 and 41 may be provided with winding N4. A dotted end of winding N4 terminates at a terminal 73. The non-dotted end of winding N4 is supplied through a diode D5 and through a low volt regulator 75 to become terminal 77. Terminals 77 and 73 form one separate direct current output, while terminals 39 and 41 form another separate direct current output.

The low volt regulator 75 has an input connected to the dotted end of the winding N4 in order to measure and regulate the voltage between terminals 77 and 73. The relative currents and voltages available to the windings N3 and N4 will depend upon the input voltage and current and the number of turns between windings N3 and N4. The low volt regulator can assist in maintaining the voltage between terminals 77 and 73 to a point below that appearing at winding N4. As such the design of the power supply system 21 should contemplate the relative voltages which will be needed at terminals 77 and 73, versus the likely voltage which is expected to be needed at terminals 39 and 41.

A sense lead is connected between the low volt regulator 75 and the current/voltage comparator 45 to enable the current/voltage comparator 45 to make adjustments to help maintain the relative voltages which will be needed at terminals 77 and 73 versus the likely voltage which is expected to be needed at terminals 39 and 41, as well as to help regulate the operation of transistor Q1 for the highest efficiency in supplying both the voltages appearing at terminals 77 and 73, as well as at terminals 39 and 41.

At the lower right side of FIG. 3, a fiber optic selecting network 81 is shown. A connector 83 has a series of fiber optic connectors 85 for receiving light energy, and it has fiber optic source line 87 for supplying fiber optic energy away from the connector 83. A passive fiber optic set 89 has a series of fiber optic transmitting connectors 91 for re-directing the light supplied through fiber optic source line 87 into a corresponding series of fiber optic receiving connectors 91. As seen not all of the fiber optic transmitting connectors 91 are connected to the line supplied by fiber optic source line 87. Only those fiber optic connectors 85 will be illuminated which are in alignment with those of the fiber optic transmitting connectors 91 which are connected to the line receiving light from fiber optic source line 87. In this configuration, a user simply attaches a passive fiber optic set 89 to the connector 83 which carries the fiber optic source line 87 in order to operate. The proper configuration indication for the voltages which must appear at terminals 77 and 73, and at terminals 39 and 41 will be carried in accord with the fiber optic connectivity held within the passive fiber optic set 89. As a result, the power supply system 21 is controlled by a logic of connectivity or optical return, and this instruction need not be linear or logical where it is desired to make average user unable to circumvent the ability to control the power supply system 21 without possession of the correct instructing structure.

While the present invention has been described in terms of a power supply system using a pulse width modulation controller and a coded structure to prohibit unauthorized tampering and control of the power supply (and possibly using conductivity and optical connectivity as techniques as a control mode for the coded structure), the present invention may be applied in any situation where some limited degree of control is to be given to users, but where untrammeled control, play, and experimentation on the appliance is to be prohibited.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A power supply comprising:
 a transformer having a power input side and a direct current power output side;
 a pulse width modulation controller having a control output for controlling the current of said input side of said transformer and a control input;
 a power output selecting network having an output and an input;
 at least one of a current comparator and a voltage comparator having a first input associated with the power output side of said transformer and a second input from an output of a power output selecting network and a control output connected to said control input of said pulse width modulation controller, said comparator for controlling said pulse width modulation controller to achieve a desired voltage and current output of said power output side of said transformer; and
 a logic array having an output connected to said input of said power output selecting network.

2. The power supply as recited in claim 1 wherein said logic array further comprises a set of switches connected to said logic array.

3. The power supply as recited in claim 2 wherein said logic array is a resistance logic array having resistances associated with said set of switches.

4. The power supply as recited in claim 1 wherein said logic array further comprises set of fiber optic connections, for returning a coded light array to said selecting network indicative of said desired voltage and current output of said power output side of said transformer.

5. The power supply as recited in claim 1 and further comprising an opto coupler interposed between said control input of said pulse width modulation controller and said control output of said at least one of a current comparator and a voltage comparator.

\* \* \* \* \*